United States Patent [19]
Taylor

[11] 3,968,322
[45] July 6, 1976

[54] WIRING DUCT
[75] Inventor: Philip W. Taylor, Howell, Mich.
[73] Assignee: Taylor Industries, Inc., Howell, Mich.
[22] Filed: Mar. 22, 1973
[21] Appl. No.: 343,950

Related U.S. Application Data
[63] Continuation of Ser. No. 166,217, July 26, 1971, abandoned, which is a continuation of Ser. No. 825,784, May 19, 1969, abandoned.

[52] U.S. Cl. .............................. 174/72 A; 174/101
[51] Int. Cl.² ......................................... H02G 3/04
[58] Field of Search ................ 174/72 A, 68 C, 101; 317/122

[56] References Cited
UNITED STATES PATENTS
| 2,082,099 | 6/1937 | Cruser | 174/72 A UX |
| 2,921,607 | 1/1960 | Caveney | 174/72 A X |
| 3,024,301 | 3/1962 | Walch | 174/72 A |

Primary Examiner—Laramie E. Askin
Attorney, Agent, or Firm—Hauke & Patalidis

[57] ABSTRACT

A wiring duct, or wireway, of the type used in electrical equipment for supporting and retaining electrical conductors and for permitting individual conductors to be routed to and from the wiring duct, in the form of a U-shaped channel having sidewalls, at least one of which has a plurality of longitudinally spaced slits open to the edge of the wall defining a plurality of flexible finger-like members. Each slit is substantially wider at one end than the other and has sides diverging at a predetermined angle towards the edge of the sidewall but terminating proximate each edge by a narrow gap restriction permitting passage of the conductors routed through the slit as a result of the deflection of the flexible finger-like members. The width of each slit at its widest portion is at least 1.5 that of its width at its narrowest portion.

10 Claims, 8 Drawing Figures

WIRING DUCT

CROSS REFERENCE TO RELATED APPLICATIONS

This application is a continuation of application Ser. No. 166,217, filed July 26, 1971, which was a continuation of application Ser. No. 825,784, filed May 19, 1969, now both abandoned.

BACKGROUND OF THE INVENTION

The invention relates to wiring ducts, or wireways, for the reception of bundles of electrical conductors for use in control panels and electrical cabinets. Such wiring ducts are used for holding, supporting and retaining electrical conductors in an orderly manner within a channel, and for permitting individual electrical conductors to be routed from the channel to electrical elements which are interconnected by means of the conductors.

In electrical equipment wherein a plurality of electrical conductors or wires are used for interconnecting diverse elements of the equipment, such as control panels and cabinets for machine tools, welders, electrochemical machining machines, electrical discharge machining, etc., it is desirable to obtain a neat routing of the interconnecting electrical conductors. The problem is often complicated in view of the small space available, the multitude of conductors, and the plurality of varied elements interconnected. The diverse electrical conductors may be placed in juxtaposition in a bundle or harness arrangement as a result of lacing together a plurality of conductors, the bundles or harnesses being attached to a supporting panel by appropriate means. However, it has become a generally accepted procedure in the field, for the sake of neatness and safety, and for the ease of repair which may require replacement of some of the electrical elements, to route bundles of conductors through one or several wiring ducts or wireways, each generally in the form of a U-shaped channel which is cut to appropriate length to fit the installation. Such U-shaped channels are sometimes made of stamped metal or metallic grillwork, but generally they are made of a flexible plastic material or the like. They are attached to the panel or other support means by way of conventional fasteners, such as screws and the like, passed through appropriate mounting holes disposed in the base of the channels, or they are held in position by means of clips or like means. The many electrical conductors required for the installation are routed between elements through such ducts and they are usually held within such ducts by means of a snap-on cover. The ducts are provided with apertures permitting the individual conductors from the bundle to be routed into or from the duct for connection to appropriate electrical elements at various locations. Such apertures may be in the form of a plurality of circular holes, as shown in U.S. Pat. Nos. 3,126,444 and 2,867,681, or they may be in the form of parallel sided slits, as disclosed in U.S. Pat. Nos. 3,156,756, 3,229,029, 2,921,607 or they may be in the form of spaces between the elements of a grillwork as disclosed in U.S. Pat. No. 3,024,301, for example, the slits being sometimes open to the edge of the sidewall in which they are disposed preferably by way of a restricted passage, such restricted passage permitting the individual conductors to be routed through the sidewalls by snapping through the passageway into the slit, while closed slits and other apertures require the wire end to be threaded through the aperture.

The present invention contemplates a wiring duct or wireway, generally U-shaped in cross section and provided with a plurality of slits in at least one sidewall thereof. The slits are of the open variety, that is they are open to the edge of the sidewall, and each slit is provided with diverging sides from the bottom or base portion of the channel to the edge of the sidewall, terminating at the edge itself with a restricted gap portion so as to normally hold in each slit a plurality, if so required, of conductors routed through the sidewall of the duct. The remaining portions of the sidewall between consecutive slits form substantially flexible separate finger-like members having an enlarged free end proximate the edge of the sidewall. The finger-like members have a width proximate the bottom or base portion of the channel which is greater than the width of the finger-like members proximate their enlarged free end near the edge of the sidewall.

Such a structure provides an increased area of open slit for a multitude of electrical conductors to pass through the sidewall at a given slit position, while not reducing the strength of the sidewall portions remaining after the slits have been punched out and which define the finger-like members, especially at the root of each finger-like member integral with the remaining of the sidewall, which is thus proportionally widened according to the amount of divergence of the slit sides. A further advantage of the construction of the present invention is to provide a greatly increased open area at the portion of the slit proximate the edge of the sidewall where the majority of connecting wires or conductors are generally routed for attachment to electrical elements having terminals generally disposed a certain distance away from the surface on which the elements are mounted. Furthermore, the construction of the present invention provides finger-like members formed by the remaining portions of the sidewall between consecutive slits which are substantially stiff, where so desirable, i.e. at the root where they are made integral with the remaining portion of the sidewall proximate the base of the duct, and having a narrower body portion proximate the edge of the sidewall where stiffness of the finger-like members becomes less important. Because of the increased area resulting from forming in the sidewall slits having divergent and non-parallel sides, there is less material remaining in the finished duct than is the case in conventional construction, with the result that the duct is substantially lighter than a conventional duct, without any sacrifice as to rigidity and sturdiness, and the material punched out from the slits is not entirely lost as it can be remelted and reused for extrusion of further ducts or other products.

It is significant that the finished channel according to the present invention includes spaced fingers which by reason of the teachings of the invention provide a plurality of wedge surfaces at the bottom and at the upper corners of the slits. This provides a solid holding arrangement for retaining certain of the wires near the open end of the slit against lateral displacement out of the open end. At the same time, wires retained in place at the bottom of the slit are held in place from vertical displacement by a like wedge effect. This is important when wires are being threaded in the channel before the locking cover has been clamped in place.

SUMMARY OF THE INVENTION

The present invention therefore relates to a novel wiring duct construction having at least one sidewall of a U-shaped channel provided with a plurality of regularly disposed slits open to the edge of the sidewall by way of a restricted gap, the slits having a pair of opposed sides substantially diverging with a predetermined optimum angular relationship from their end proximate the base of the channel to their end proximate the edge of the sidewall. This results in greater strength in the fingers thus defined and provides for a greater material concentration at the point of maximum stress. It has been possible with the ducts designed according to the present invention to permit the wiring duct to be used for wires of a larger cross-sectional area than heretofore possible with wiring ducts of the same size and strength requirements without adding to their cost. Providing the slits with diverging sides gives an enlarged width only at the top. Since the fingers remain as wide at the bottom as before, their strength is not diminished. However, the wider open area at the top will accommodate the larger diameter wires occasionally encountered without adding undue cost to the wiring duct. This represents a substantial advancement.

The various objects and advantages of the present invention will become apparent to those skilled in the art when the following description of preferred embodiments thereof is read in conjunction with the accompanying drawings.

DETAILED DESCRIPTION OF THE PREFERRED EMBODIMENTS

Figure 1:
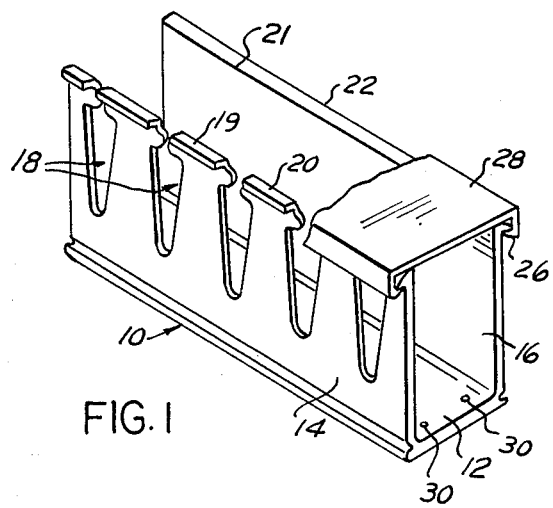
FIG. 1 is a fragmentary perspective view, partly in section, of an example of improved wiring duct according to the invention, with an appropriate cover also shown in a fragmentary manner.

Referring now to FIG. 1, there is shown a wiring duct 10, generally in the form of a U-shaped channel, provided with a bottom or base portion 12 and a pair of substantially parallel sidewalls 14 and 16 preferably made integral with the base portion 12. The U-shaped channel 10 may be made of any appropriate material such as sheet metal, substantially hard rubber, or preferably a plastic. Preferably, the U-shaped channel is extruded in elongated sections several feet long and, subsequently, at least one sidewall thereof is provided with a plurality of longitudinally spaced slits, shown generally at 18, relatively to the sidewall 14, by means of conventional punch and die apparatus. In the structure illustrated at FIG. 1, only one of the sidewalls, namely sidewall 14, is thus provided with the slits 18, while the other sidewall 16 is left imperforate. The sidewalls, at their free edge thereof, have integral outwardly projecting flanges as shown at 20 and 22 relative respectively to edge 19 and to edge 21, adapted to interlock with the inwardly projecting flanges 24 and 26 of a snap-on cover 28 adapted to removably close the open end of the channel. Preferably, the interlocking arrangement between the flanges of the cover and the flanges of the channel, and the cover 28 itself, are of the structure disclosed in detail in U.S. Pat. No. 3,126,444.

The base portion 12 of the wiring duct 10 is provided with a plurality of mounting apertures, as shown at 30, for mounting of the channel on an appropriate base or support panel within an electrical cabinet or on a control panel.

Figure 2:
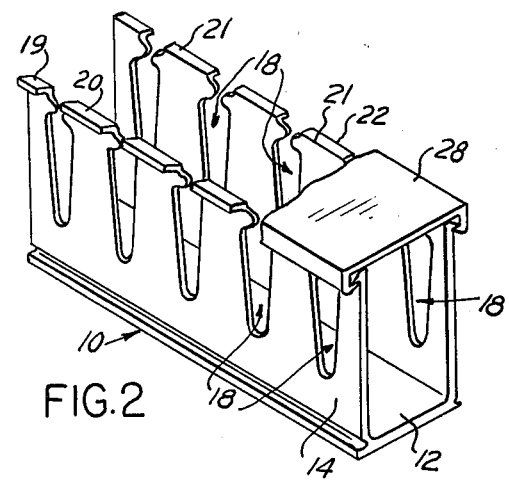
FIG. 2 is a fragmentary perspective view, partly in section, of a modified form of the improved wiring duct of the invention.

The structure represented at FIG. 2 is identical to the structure of FIG. 1, with the exception that both the sidewalls 14 and 16 are provided with slits 18.

Figure 4:
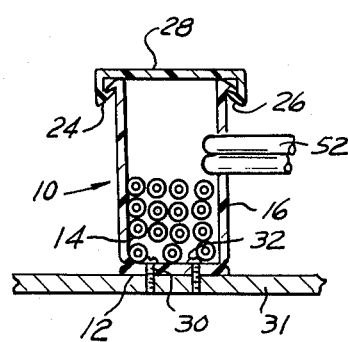
FIG. 4 is a transverse cross-section of the wiring duct of FIGS. 2–3, shown attached to a support panel and partly filled with a plurality of electrical conductors.
Figure 3:
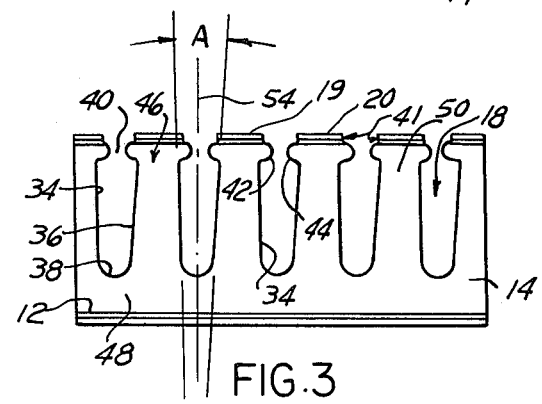
FIG. 3 is a fragmentary elevational view of the wiring duct of FIG. 2, with the cover removed.
Figure 5:
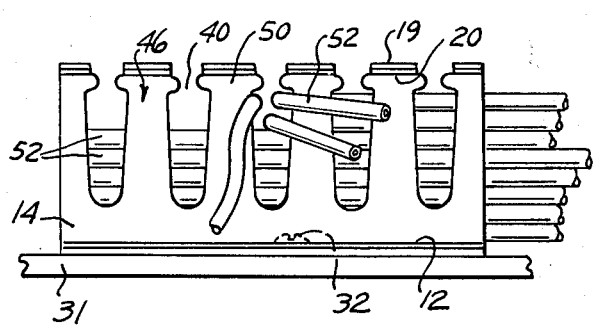
FIG. 5 is a view similar to FIG. 3 but showing the wiring duct partially filled with a plurality of conductors, some of which are routed through a slit of the duct.
Figure 6:
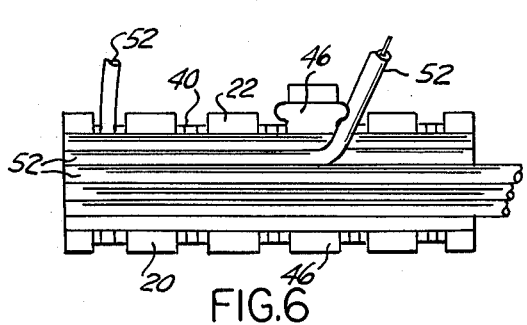
FIG. 6 is a fragmentary view of the duct of FIGS. 2–5, seen from the top with the cover removed.

As best shown in the side elevation view of FIG. 3, the slits 18 in the sidewall, as for example sidewall 14, are preferably disposed in a regular pattern, substantially equidistant from each other. Each of the longitudinally spaced slits 18 has a pair of opposed sides 34 and 36 symmetrically diverging away from the bottom or base portion 12 of the channel, the two opposed sides 34 and 36 being joined proximate the base section 12 by way of an arcuate side 38. The effect of the diverging sides 34 and 36 is to provide a wedge type configuration with the bottom arcuate side 38. The included angle A is shown between the extended sides 34, 36 and symmetrical with respect to axis 54. The angle A preferably falls between 4° and 30° to provide optimum holding strength although angles of 5° to 45° have been successfully used as disclosed in applicant's parent application Ser. No. 825,784. Each slit 18 is open to the edge 19 of the sidewall by way of a narrow gap 40 progressively widening at the edge as shown at 41. The fourth side of each slit 18 is defined by a pair of curved, aligned separate sides 42 and 44, at least a portion of each of which is generally parallel to the base portion 12 of the channel. This forms a pair of opposed, wedge type configurations at the upper corners of each slit 18. The plurality of slits 18 cut from the sidewall thus leaves remaining portions of the sidewall between consecutive slits which form finger-like members 46, each of which has a pair of converging sides 36 and 34, generally converging toward the edge 19 of the sidewall. Each finger-like member 46 is integrally connected to the remaining portions of the sidewall 14 by way of a relatively wide section, as shown at 48, and has a generally enlarged end as shown at 50, proximate the edge 19 of the sidewall. In use, as shown particularly at FIGS. 4–6, the wiring duct 10 defined by the U-shaped channel is mounted on a support panel 31 by means of fasteners such as screws 32 passed through the mounting apertures 30 in the base 12. A plurality of insulated electrical conductors 52 is routed through the wiring duct 10 such as to establish electrical connections between diverse elements of the electrical installation. Where it is desirable to route a particular conductor to the exterior of the wiring duct 10, the appropriate conductor is passed through a slit 18 proximate the electrical element (not shown) to which it is to be connected. This is best accomplished, as illustrated at FIG. 6, by deflecting a finger-like member 46 inwardly or preferably outwardly in a direction normal to the longitudinal axis of the channel such as to widen the gap 40 to a sufficient width permitting passage of an electrical conductor 52 through the gap, and letting the substantially flexible finger-like member 46 snap back to its original position. In this manner, as best illustrated in FIG. 5, the emerging electrical conductors 52 remain trapped through the slit 18 and are generally prevented from escaping from the slit, even though the cover 28 may be removed from the channel. The width of the gap 40 is obviously less than the outer diameter of the electrical conductor 52, and, as most electrical installations utilize generally wires or electrical conductors all of the same dimension, a predetermined gap may be used which provides effective holding of the electrical conductors passing through the slit. It is also obvious that the gap 40 may be made very narrow such that it is narrower than the smallest outside diameter of any electrical conductor which may be used in the installation. Furthermore, once the cover 28 is snapped into position, it operates as an additional effective means for preventing any electrical conductor from escaping from the slits.

The tapered shape of the slits 18, with sides 34 and 36 diverging toward the edge of the sidewall results in several important effects in addition to those hereinbefore referred to. Each finger-like member 46 is substantially rigid at the base thereof where it is integrally connected to the remaining portions of the sidewall, thus providing sturdy containment of the bundle of wires 52, and it is progressively more flexible from the base to the free end thereof, thus permitting easy deflecting of the finger-like member in order to widen the gap 40 for passing electrical conductors therethrough. Furthermore, each slit 18 is substantially wider proximate the edge 19 of the sidewall where it is often desirable to pass several conductors through one slit for connecting to electrical elements having terminals generally placed a distance away from the element support base. Additionally, the aligned sides 42 and 44 of the slit, proximate the edge 19 of the sidewall, naturally tend to engage the periphery of the electrical conductors 52 emerging from the slit in such manner as to counteract any tendency that the conductors may have to slide toward the gap 40.

Figure 7:
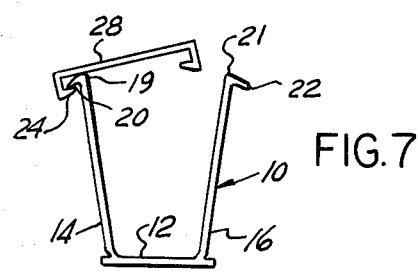
FIG. 7 is a transverse sectional view of the wiring duct of FIGS. 2–6, with the cover thereof in the process of being snapped to the edge thereof.

As shown in FIG. 7, the sidewalls 14 and 16 of the U-shaped channel forming the duct 10 have a normal tendency, when the cover 28 is removed, to form planes generally converging towards the base 12 of the channel, such as to facilitate the snapping on of the cover 28, once the installation is completed. When the cover 28 is snapped on, the free edges 19 and 21 of the sidewalls 14 and 16 are urged closer together, the width of the cover 28 being such that the sidewalls 14 and 16 become generally parallel to each other once the cover is in position.

Figure 8:
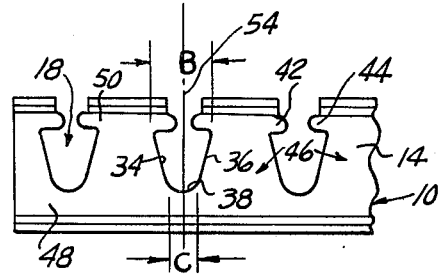
FIG. 8 is a view substantially similar to FIG. 3, but showing a modification of the wiring duct of the present invention.

The sides 34 and 36 of the slit 18, as shown in FIG. 3, define an included angle of approximately 8°. However, in some applications, as shown in FIG. 8, the included angle may be as large as 30°. The range falling between 4° and 30° has been found to give significantly improved results.

Wiring ducts are made in different sizes. For example, the sidewall height may extend from three quarters of an inch or less to four inches or more, with comparable variations of width of the channels. In ducts having a substantial sidewall height, and where it is desired to have relatively closely spaced slits, the included angle between opposite lateral sides of the slit will be comparatively less than is the case in ducts having a substantially short sidewall height, where it is desired to have more widely spaced slits. Preferably, but not necessarily so, the slits are generally symmetrical as shown in FIGS. 3 and 8 relative to the axis of symmetry arbitrarily represented by dash and dot line 54, the axes of symmetry of the diverse slits being parallel to each other and generally normal to the plane of the base 12 of the channel and to the edge of the sidewall. The wiring duct shown at FIG. 8 illustrates an example of a wiring duct 10 in the form of a U-shaped channel having at least a sidewall 14 provided with a plurality of regularly spaced slits 18, each having converging sides 34 and 36 forming an included angle within the limits previously described in connection with FIG. 3.

The present invention is somewhat differently shown with respect to the width of the slit 18 referenced again to the axis 54 which is normal to the terminal edge 19. The width B at the upper end of the slit 18 will be seen to be substantially greater than the width C measured proximate the lower end of the slit 18, and the ratio of the width B to the width C is comprised between 1.5 to 1 and 3 to 1 for best results of the duct holding capability, finger stiffness at the root and ease of finger lateral deflection at the tip. Otherwise stated, the slits 18 are so shaped that there is provided a mechanical clearance between the sides 34, 36 at the top which is of a predetermined greater size than the mechanical clearance between the sides 34, 36 at the bottom. The clearance C at the bottom of the slit 18 is measured proximate points of tangency between the arcuate side 38 and the sides 34 and 36, respectively. The clearance B at the top of the slit 18 is measured proximate the points of tangency between the lower curved edges of the sides 42, 44 and sides 34, 36, respectively. The importance of this feature lies in the resultant superior strength and holding quality of the duct assembly.

Although the present invention has been described and illustrated relative to a structural arrangement of wiring duct consisting of a channel-shaped member, it is obvious that the particular structure of the sidewall slits herein disclosed may be adapted to electrical conductor fanning strips and other structures of wiring ducts and wireways where it is desired to hold and support electrical conductors routed through a panel, wall or the like, in an electrical installation.

Having thus described the invention by way of examples of structural embodiments thereof, given for illustrative purpose only, what is claimed as new is:

1. In a wiring duct for supporting a plurality of electrical conductors generally of a predetermined diameter, said duct comprising an elongated channel of a substantially U-shaped cross section defining a substantially planar base portion and a pair of substantially planar sidewalls projecting integrally from said base portion, a plurality of evenly spaced substantially alike slits formed in at least one of said sidewalls and having parallel axes of symmetry normal to a terminal edge of said sidewall and said slits being open to said edge of said sidewall, a plurality of evenly spaced substantially alike finger-like members being thusly defined between consecutive slits, each of said finger-like members being widened at the end portion thereof proximate the terminal edge of said sidewall for defining a narrow gap open end for each of said slits, said channel being made of a substantially flexible material for permitting deflection of said finger-like members in a direction generally normal to the longitudinal axis of said channel to provide widening of said narrow gap open end of said slit for passage therethrough of said electrical conductors, the side of said slit proximate said terminal edge of said sidewall being defined by a pair of aligned separate side portions of consecutive finger-like members substantially parallel to said base portion of the channel, the improvement comprising each of said slits having its opposite sides substantially straight and diverging one from the other in the direction of said terminal edge such that each of said slits is wider proximate the widened end portion of said finger-like members than proximate said base portion, said sides being disposed at an angle of the order of between 5° and 30°, said sides further being joined proximate said base portion by an arcuate side, the ratio of the width of said slit at the widest portion thereof to the width of said slit at the narrowest portion thereof being at least 1.5 to 1 and the width of the narrow gap open end of said slits being less than the width of each of said slits at the narrowest portion thereof.

2. The wiring duct of claim 1 wherein the narrow gap open end of said slits widens from proximate the terminal edge of said sidewall to said terminal edge.

3. The wiring duct of claim 1 wherein both said sidewalls are provided with said slits.

4. The wiring duct of claim 1 wherein the gap open end of each of said slits includes a pair of successively convergent and divergent arcuate curved edges.

5. In a wiring duct for supporting a plurality of electrical conductors generally of a predetermined diameter, said duct comprising an elongated channel of a substantially U-shaped cross section defining a substantially planar base portion and a pair of substantially planar sidewalls projecting integrally from said base portion, a plurality of evenly spaced substantially alike slits formed in at least one of said sidewalls and having parallel axes of symmetry normal to a terminal edge of said sidewall and said slits being open to said edge of said sidewall, a plurality of evenly spaced substantially alike finger-like members being thus defined between consecutive slits, each of said finger-like members being widened at the end portion thereof proximate the terminal edge of said sidewall for defining a narrow gap open end for each of said slits, said channel being made of a substantially flexible material for permitting deflection of said finger-like members in a direction generally normal to the longitudinal axis of said channel to provide widening of said narrow gap open end of said slit for passage therethrough of said electrical conductors, the side of said slit proximate said terminal edge of said sidewall being defined by the widened end portions of two consecutive finger-like members, the improvement comprising each of said slits having its opposite sides substantially straight and joined by an arcuate side proximate said base portion and being separated at said arcuate side one from the other at corresponding points of tangency to said arcuate side by a predetermined first distance, said sides being separated one from the other proximate the widened end portions of said finger-like members by a predetermined second distance, the ratio of said second distance to said first distance being of the order of between 1.5 to 1 and 3 to 1.

6. The wiring duct of claim 5 wherein both said sidewalls are provided with said slits.

7. In a wall for supporting a plurality of electrical conductors, said wall comprising a planar portion, a plurality of evenly spaced substantially alike slits formed in said planar portion and having parallel axes of symmetry normal to a terminal edge of said planar portion and said slits being open to said edge of said planar portion, a plurality of evenly spaced substantially alike finger-like members being thus defined between consecutive slits, each of said finger-like members being widened at the end portion thereof proximate the terminal edge of said planar portion for defining a narrow gap open end for each of said slits, said wall being made of a substantially flexible material for permitting deflection of said finger-like members in a direction generally normal to the plane of said planar portion to provide widening of said narrow gap open end of each of said slits for passage therethrough of said electrical conductors, the side of each of said slits proximate said terminal edge of said planar portion being defined by a pair of aligned separate side portions of consecutive finger-like members substantially parallel to said terminal edge, the improvement comprising each of said slits having its opposite sides substantially straight and diverging one from the other in the direction of said terminal edge, said sides being disposed at an angle of the order of between 5° and 30° such that the width of each of said slits is greater proximate the widened end portion of said finger-like members than proximate said base portion, and the ratio of the width of each of said slits at the widest portion thereof to the width of each of said slits at the narrowest portion thereof being at least 1.5 to 1.

8. The wall of claim 7 wherein the narrow gap open end of each of said slits widens from proximate the terminal edge of said planar portion to said terminal edge.

9. The wall of claim 7 wherein the gap open end of each of said slits includes a pair of successively convergent and divergent arcuate curved edges.

10. The wall of claim 9 wherein the closed end of each of said slits is arcuate.

* * * * *